March 20, 1962 V. H. JUNGJOHANN 3,025,760
INDEXING GEAR MEANS FOR SLIDE CHANGER
Filed May 28, 1959 4 Sheets-Sheet 1

Vernon H. Jungjohann
INVENTOR.
BY
ATTORNEYS

March 20, 1962 V. H. JUNGJOHANN 3,025,760
INDEXING GEAR MEANS FOR SLIDE CHANGER
Filed May 28, 1959 4 Sheets-Sheet 2

Vernon H. Jungjohann
INVENTOR.
BY
ATTORNEYS

March 20, 1962 V. H. JUNGJOHANN 3,025,760
INDEXING GEAR MEANS FOR SLIDE CHANGER
Filed May 28, 1959 4 Sheets-Sheet 3
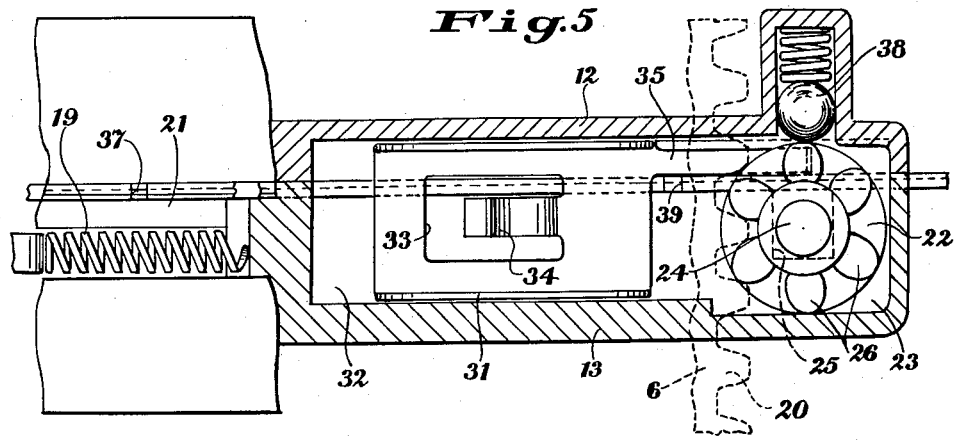
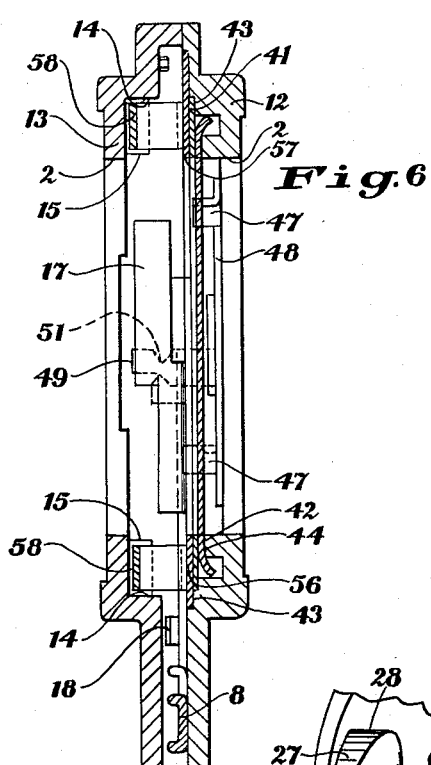
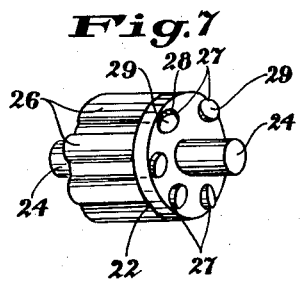
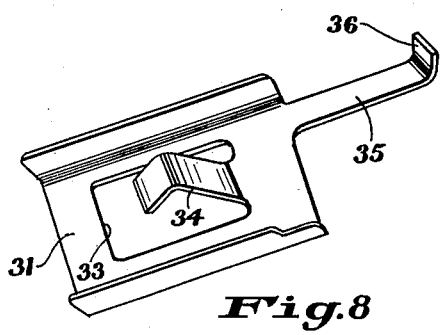
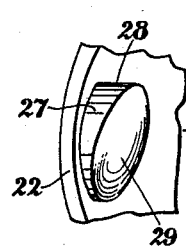
Vernon H. Jungjohann
INVENTOR.
BY
ATTORNEYS March 20, 1962 V. H. JUNGJOHANN 3,025,760
INDEXING GEAR MEANS FOR SLIDE CHANGER
Filed May 28, 1959 4 Sheets-Sheet 4
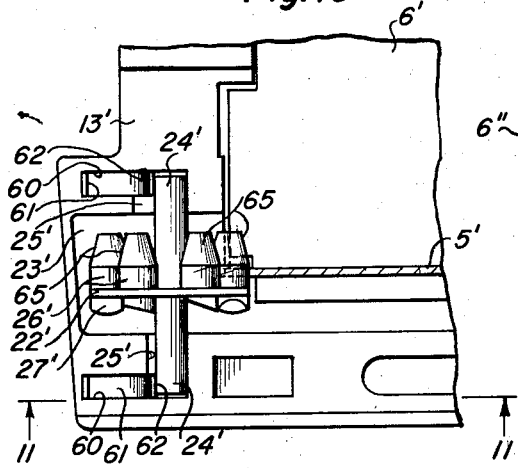
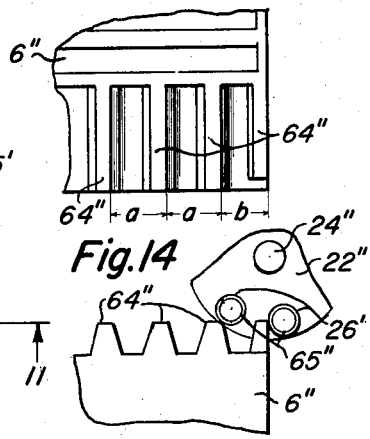
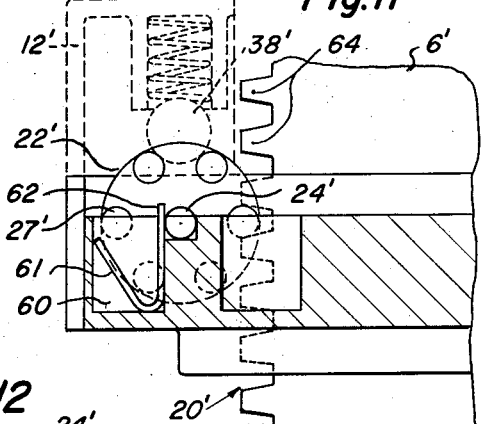
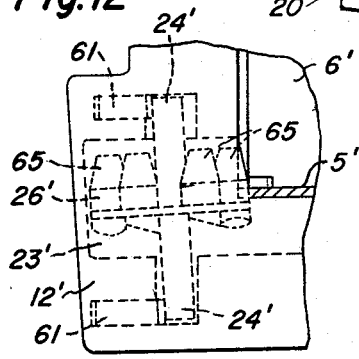
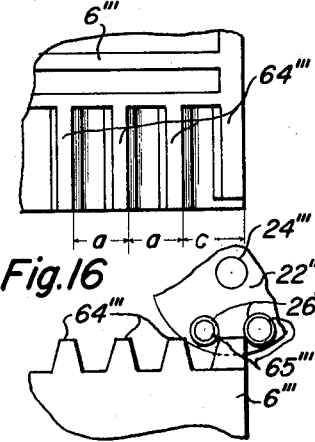
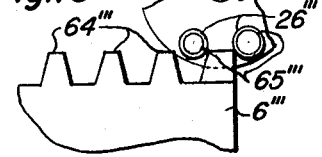
VERNON H. JUNGJOHANN
INVENTOR.
BY R. Frank Smith
Steve W. Graham
ATTORNEYS

United States Patent Office 3,025,760
Patented Mar. 20, 1962

3,025,760
INDEXING GEAR MEANS FOR SLIDE CHANGER
Vernon H. Jungjohann, Rochester, N.Y., assignor to Eastman Kodak Company, Rochester, N.Y., a corporation of New Jersey
Filed May 28, 1959, Ser. No. 816,517
4 Claims. (Cl. 88—28)

This invention relates generally to apparatus for exhibiting transparent slides, and more specifically to a slide changer having an improved indexing gear means for driving a magazine, and adapted to accommodate magazines in which the pitch of the leading tooth is different from the pitch of the remaining teeth in the magazine.

The present application is a continuation-in-part of application Serial No. 698,159 filed November 22, 1957, now U.S. Patent No. 2,916,965. One of the disadvantages encountered in slide changers of the type disclosed in application Serial No. 698,159, is that magazines cannot be used in the slide changer where the pitch of the leading tooth in the magazine rack differs from the pitch of the remaining teeth and indexing gear. Applicant has overcome this objection with his improved slide changer in which the leading tooth of the magazine as it is inserted into the changer cams the indexing gear in a direction transverse to the direction of travel of the magazine permitting the leading tooth to slide past the gear tooth which is then urged by the spring into the groove between the leading tooth and the next succeeding tooth. Since the pitch of the remaining teeth in the magazine is equal to the pitch of the indexing gear, the magazine may be manually moved or driven by the gear without any binding or jamming between the magazine rack and indexing gear.

One of the primary objects of the present invention is to provide an improved slide changer for a slide projector that is of simple design and construction, thoroughly reliable and efficient in operation, and economical to manufacture.

Another object of this invention is to provide an improved indexing gear means for driving the magazine of a slide projector and adapted to accommodate magazines in which the pitch of the leading tooth is different from the pitch of the remaining teeth in the magazine rack and the pitch of the indexing gear.

Still another object of this invention is to provide a spring mounted indexing gear for driving the magazine of a slide projector.

Objects and advantages other than those set forth above will be apparent from the following description when read in connection with the accompanying drawing, in which:

FIG. 5 is an enlarged section view taken along line 5—5 of FIG. 2 with both the rear and front frame members secured together as in FIG. 1 and having a segmental portion of the magazine superimposed thereon showing the gear rack;

FIG. 6 is an enlarged section view taken along line 6—6 of FIG. 2 with both the rear and front frame members secured together as in FIG. 1;

FIG. 7 is a perspective view of the indexing gear shown in FIG. 5;

FIG. 8 is a perspective view of the pawl shown in FIG. 5;

FIG. 9 is an enlarged perspective view of one of the projections carried by the gear;

FIG. 10 is a segmental view in side elevation of the front frame member of the slide changer of FIG. 1 showing a modified form of the indexing gear assembly of this invention;

FIG. 11 is a view partially in section substantially taken along lines 11—11 of FIG. 10;

FIG. 12 is a segmental view similar to FIG. 10 with both frame members secured together and showing the indexing gear in dotted lines being cammed over by the leading tooth of the magazine rack;

FIG. 13 is a segmental view of a magazine rack in which the pitch of the leading tooth is less than the pitch of the remaining teeth;

FIG. 14 is a segmental view in side elevation of the magazine rack of FIG. 13 showing the indexing gear in engagement therewith;

FIG. 15 is a view similar to FIG. 13 in which the pitch of the leading tooth is greater than the pitch of the remaining teeth; and FIG. 16 is a segmental view in side elevation of the magazine rack of FIG. 15 showing the indexing gear in engagement therewith.

Figure 1:
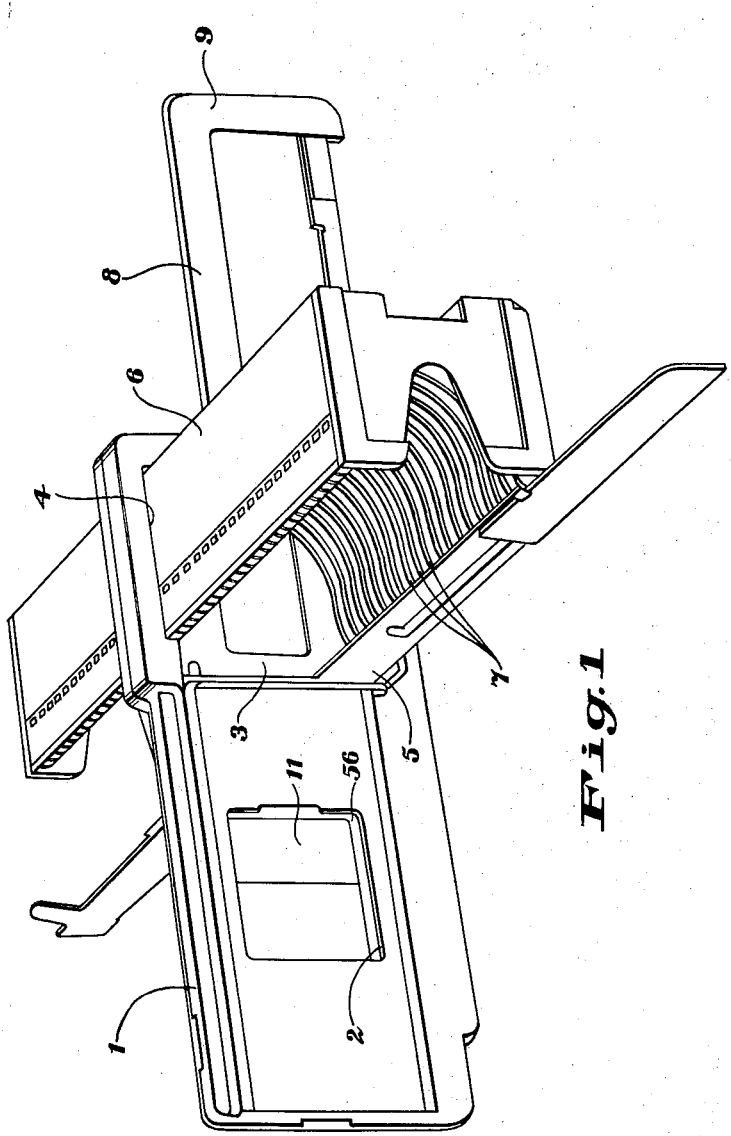
FIG. 1 is a perspective view of a slide changer embodying the invention.

As shown in the drawings, the slide changer has a narrow substantially rectangular housing 1 adapted to fit into a suitable slot in a projector, not shown, so that an aperture 2 in the housing 1 aligns with a lens and source of light contained within the projector. Thus, when a slide 3 to be viewed is in alignment with the optical system, a representation will be thrown onto a screen, not shown. The housing 1 is provided with an opening 4 near one end and a magazine supporting and guiding means 5 is disposed therein transversely of the housing 1 and secured thereto by any suitable means. A magazine 6 is slidably mounted on the supporting and guiding means 5 and contains a plurality of partitions 7 which cooperate with one another to form individual slide holders. A slide-transferring means 8 is shown projecting outwardly from one end of the housing 1 and is adapted when moved by the handle 9 toward the magazine 6 to engage a slide 3 and move it out of the magazine 6 into the housing 1 in register with the aperture 2. As the slide 3 and slide-transferring means 8 move into the housing 1, shutter means 11 carried by the housing 1 are opened and light passes through the slide 3. As the transfer member 8 is moved back to its original position, it pushes the slide 3 out of the housing 1 and returns it to its original location in the magazine 6. As the transfer member 8 moves toward a fully withdrawn position, it actuates a mechanism which advances the magazine 6 a sufficient distance to place a succeeding slide holder and slide 3 in alignment with the housing 1 and transfer member 8.

Figure 2:
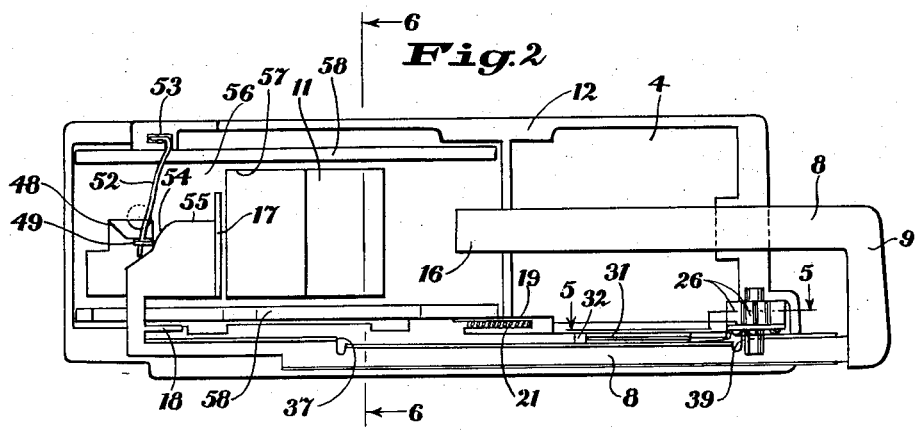
FIG. 2 is a side elevation view of the rear frame member of the slide changer of FIG. 1 with a slide transfer member, spring, pawl and indexing gear superimposed thereon.

As shown in greater detail in FIGS. 5 and 6, the housing 1 is formed of a pair of complementary frame members 12, 13, secured together by any suitable means. The frame member 13 is provided with shoulders 14 forming a channel for guiding the slide 3, and is further provided with abutments 15 to limit the forward movement of the slide 3 and position the slide in register with the aperture 2. The slide-transferring means 8 is shown in FIG. 2 as a generally C-shaped member having an arm 16 adapted to engage one edge of the slide 3 to move the slide into register with the aperture 2 as the transfer member 8 is moved into the housing 1 by means of the handle 9. The transfer member 8 also forms a flange 17 adapted to engage the opposite edge of the slide 3 to move the slide back into the magazine 6 when the transfer member 8 is returned to its original position. The transfer member 8 has a finger 18 adapted to engage and compress a spring 19 disposed in a small channel 21 formed by the frame member 13 as the transfer member 8 is moved into its fully withdrawn position. When the transfer member 8 is released, the spring 19 urges the transfer member 8 into the housing 1 a slight amount causing the flange 17 to be withdrawn from the edge of the opening 4, and enables the magazine 6 to be moved back and forth by hand free of interference with the magazine 6 and slides 3.

The magazine-advancing mechanism as best shown in FIGS. 5, 7 and 8 comprises a plastic molded indexing gear 22 disposed within a recess 23 formed by the frame members 12, 13. The gear 22 has integrally formed spindles 24 disposed within slots 25 shown dotted in FIG. 5 formed by the frame member 13 to position the gear 22 with its gear teeth 26 partially extending into the opening 4 as seen in FIG. 2. The slide magazine 6 is provided with a gear rack 20 shown dotted in FIG. 5 extending along the magazine complementary to the gear 22 and having its gear teeth of a selected pitch so that when the rack is advanced one tooth the magazine 6 is advanced a distance sufficient to align a succeeding slide 3 with the housing 1 and transfer member 8. The gear 22 is further provided along one side with a plurality of cylindrical projections 27 angularly spaced around the gear 22 at a common radius. Each of the projections 27 is provided with an axially extending leading edge 28 and an inclined trailing edge 29 as best seen in FIG. 9. An indexing pawl 31 is disposed in a slot 32 formed by the frame members 12, 13 and essentially comprises a unitary U-shaped channel member as seen in FIGS. 2, 5 and 8 having a U-shaped groove 33 to form a spring finger 34 engageable with one of the frame members 13 to slidably retain the indexing pawl 31 in a selected position within the slot 32, and to prevent the pawl 31 from freely sliding back and forth within the slot 32. The pawl 31 further has an extending arm 35 having a lip 36 at its end adapted when the pawl 31 is moved into an indexing position to engage the leading edge 28 of the projections 27 to rotate the gear 22 one tooth and advance the slide magazine 6 one slide position. The transfer member 8 has a shoulder 37 as seen in FIGS. 2 and 5 adapted to engage and move the indexing pawl 31 within the slot 32 into the indexing position as the transfer member 8 nears its fully withdrawn position. A spring and steel ball detent means 38 is carried by the frame member 12 as seen in FIG. 2 and cooperates with the gear teeth 26 to releasably hold the gear 22 in its advanced position while the pawl 31 is returned to its original non-indexing position. A shoulder 39 of the transfer member 8 engages and urges the pawl 31 into the non-indexing position when the transfer member 8 is moved into the housing 1 to place a slide 3 in a projecting position. The lip 36 of the pawl 31 rides over the inclined trailing edge 29 of one of the projections 27 as the pawl 31 is returned to the non-indexing position.

Figure 3:
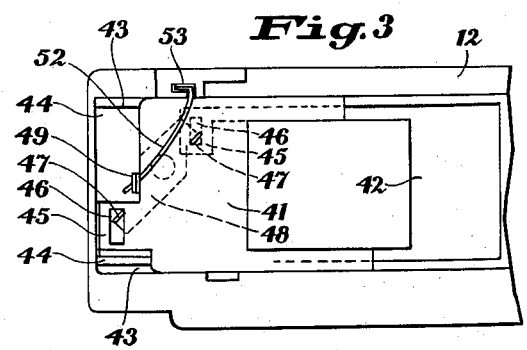
FIG. 3 is a fragmentary view of one end of the frame member of FIG. 2 with the shutter cover plate omitted showing the shutter mechanism in a wide open position.
Figure 4:
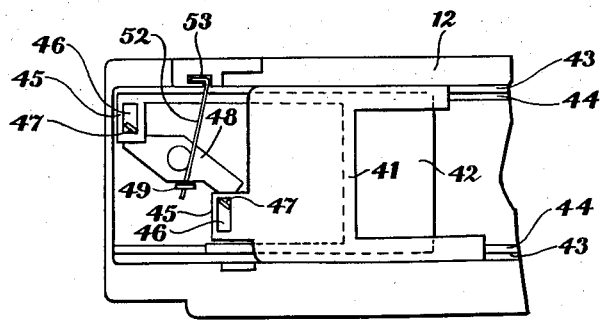
FIG. 4 is a view similar to FIG. 3 showing the shutter mechanism in a closed position.

A shutter mechanism 11 for closing the aperture 2 when a slide 3 is not present comprises a pair of substantially U-shaped shutter blades 41, 42 as seen in FIGS. 3 and 4. One of the shutter blades 41 is disposed for sliding movement along guideways 43 formed by the frame member 12, and the other blade member 42 is disposed for reciprocal sliding movement along guideways 44 with the blades in sliding contact with one another as best seen in FIG. 6. Each of the blades 41, 42 is provided with a flange 45 having an elongated slot 46 for receiving an upturned lug 47 formed by the corresponding end of a shutter lever 48. The shutter lever 48 is pivotally mounted intermediate its ends to the frame member 12. The lever 48 further has an upturned ear 49 provided with a notch 51 as seen in FIG. 6 for receiving one end of a spring 52, the opposite end of the spring 52 being held by a slot 53 formed by the frame member 12. The spring 52 is under tension so that it constantly urges the ear 49 in a counterclockwise direction as seen in FIG. 4 causing the shutter blades 41, 42 to close. The transfer member 8 is provided with a cam 54 as seen in FIG. 2 which is adapted to engage the ear 49 and pivot the shutter lever 48 causing the blades 41, 42 to open shortly before the slide 3 is disposed in register with the aperture 2. The cam 54 has a flat portion 55 cooperating with the ear 49 to releasably lock the shutter blades 41, 42 in a fully opened position when the transfer member 8 has been moved all the way in positioning the slide 3 in register with the aperture 2. Accordingly, the operator need not hold the transfer member 8 in against the bias of the shutter spring 52 while the slide 3 is being projected. A shutter cover plate 56 having an opening 57 in register with the aperture 2 is carried by the frame member 12 as seen in FIGS. 2 and 6 to cover or shield the shutter blades 41, 42 and is further provided with springs 58 adapted to urge the slide 3 against the frame member 13 during projection.

In the operation of the slide projector shown in FIGS. 1–9, let us assume initially that the magazine 6 is loaded with slides 3 and the slide transfer means 8 is in a fully withdrawn position. To project the slides 3, the operator grasps the handle 9 and moves the slide transfer member 8 inwardly causing the arm 16 to engage one edge of one slide 3 and urge the slide along the channel 14 into engagement with the abutments 15. This places the slide 3 in a slide projecting position. As the transfer member 8 is moved inwardly, the shoulder 39 engages and urges the pawl 31 into a nonindexing position. Also, the cam 54 actuates the ear 49 causing the shutter blades 41, 42 to open. After the slide 3 has been projected, the operator withdraws the transfer member 8 causing the flange 17 to engage the other end of the slide 3 and urge the slide back into the magazine 6. Initial outward movement of the transfer member 8 withdraws the cam 54 from the ear 49 permitting the shutter blades 41, 42 to close. As the member 8 nears the end of its outward travel, the shoulder 37 engages and urges the indexing pawl 31 into an indexing position causing the lip 36 to strike the leading edge 28 of the projection 27 advancing the gear 22 one tooth and the magazine 6 one slide. Also, the finger 18 compresses the spring 19, and when the operator releases the handle 9, the spring 19 urges the transfer member 8 inwardly a slight amount to withdraw the flange 17 from the opening 4 and out of engagement with the magazine 6 and slides 3.

In the modified form of indexing gear means shown in FIG. 10, the parts therein similar to the parts shown in FIGS. 1–9 will be denoted by the same numerals primed.

The magazine 6' is slidably mounted on supporting and guiding means 5' which is secured to frame member 13'. Frame member 13' has a recess 23' within which indexing gear 22' is disposed. Frame member 13' further has a pair of slots 25', one of which is slightly wider than the other, for receiving spindles 24' of gear 22'. Another pair of slots 60 are formed by frame member 13' connected to the outer end of slots 25' as best seen in FIG. 11. A substantially V-shaped spring 61 is disposed in each slot 60 having an arm 62 adapted to engage spindles 24' and urge them against one side of slots 25'.

Indexing gear 22' differs slightly from gear 22 as seen in FIGS. 5 and 7 by having a plurality of cylindrical teeth 26' engageable by gear rack 20' and having beveled edges 65 for a purpose to be explained hereinafter. The gear 22' has projections 27' engageable by indexing pawl 31 for indexing gear 22' upon movement of slide 3 as described in connection with the structure of FIGS. 1–9. A spring biased ball detent 38' is adapted to enter the groove between teeth 26' for releasably holding gear 22' in a position with one of the teeth 26' extending into one of the grooves between teeth 64 of magazine gear rack 20'.

The pitch of gear teeth 26', 64 of gear 22' and rack 20' respectively, are equal so that rotation of gear 22' progressively advances rack 20'.

Referring to the slide changer structure of FIG. 5, if all of the teeth of rack 20 are of the same pitch, and equal to the pitch of teeth 26, manually introducing magazine 6 into the slide projector will cause the leading tooth of rack 20 to engage tooth 26 and rotate gear 22 whose teeth 26 will progressively enter the grooves between the teeth of rack 20. The operator may accordingly manually reciprocally move magazine 6 within guide means 5 with no interference or jamming between teeth 26 and rack 20. This is not the case, however, where the magazine has a leading tooth whose pitch differs from the pitch of the remaining teeth in the magazine and that of the indexing gear; the pitch of the remaining teeth and indexing gear being equal. Magazines of this type and related structure are shown in FIGS. 13–16 and the parts therein similar to previously numbered parts are denoted by the same numerals double primed in FIGS. 13, 14 and triple primed in FIGS. 15, 16. The leading tooth 64″ of magazine 6″ as seen in FIGS. 13 and 14 has a pitch "b" that is less than the pitch "a" of remaining teeth 64″ and teeth 26″ of gear 22″. Consequently, as magazine 6″ is manually pushed along its guide means, leading tooth 64″ engages one of the teeth 26″ and attempts to rotate gear 22″. However, since pitch "b" is less than pitch "a," the next succeeding tooth 63″ strikes tooth 64″ and jams preventing further inward movement of magazine 6″. Also, the leading tooth 64‴ of magazine 6‴ as seen in FIGS. 15 and 16 has a pitch "c" that is greater than pitch "a" of the remaining teeth 64‴ and teeth 26‴ of gear 22‴. Consequently, as magazine 6‴ is manually pushed along its guide means, leading tooth 64‴ engages one of the teeth 26‴ and attempts to rotate gear 22‴. Once again, such pitch "c" is greater than pitch "a," the next succeeding tooth 26‴ of gear 22‴ strikes tooth 64‴ as magazine 6‴ is moved inwardly preventing further movement of magazine 6‴.

The above-identified difficulties are eliminated by the indexing gear means shown in FIGS. 10–12. If magazine 6″ or 6‴ is introduced into the projector, the leading tooth 64″ or 64‴ engages beveled edge 65 of one of the teeth 26′ and cams gear 22′ against the bias of springs 61 in a direction transverse to the direction of travel of the magazine as seen in FIG. 12. The strength of springs 61 is selected so that the force required to cam gear 22′ against springs 61 is less than the force exerted by detent means 38′. Consequently, gear 22′ is cammed over rather than being rotated by the leading tooth of the magazine. This permits the leading tooth of the magazine to slide past tooth 26′ which is urged by springs 61 into the groove between the leading tooth and next succeeding tooth. Since the pitch of the remaining teeth 64″ or 64‴ is equal to the pitch of gear teeth 26′, the magazine may be reciprocally moved without any jamming or interference between the teeth. The upper slot 25′ is wider than lower slot 25′ to accommodate further movement of upper spindle 24′ than lower spindle 24′. The upper spindle 24′ moves further because a greater portion of the force produced by the leading tooth tending to cam gear 22′ outwardly is resisted by upper spring 61 by virtue of the location of the force with respect to springs 61.

The invention has been described in detail with particular reference to preferred embodiments thereof, but it will be understood that variations and modifications can be effected within the spirit and scope of the invention as described hereinabove and as defined in the appended claims.

I claim:
1. In a slide changer for a slide projector and adapted to accept a magazine having a gear rack in which the pitch of the leading tooth differs from the pitch of the teeth that follow, the combination comprising: a housing for slidably supporting the magazine, a toothed indexing gear carried by said housing in position to engage said gear rack when said magazine is supported by said housing, said indexing gear having a gear rack engaging position in which the teeth of the indexing gear are positioned for driving engagement with said following teeth for advancing said magazine upon rotation of said gear, and means mounting said indexing gear for movement out of said gear rack engaging position when said leading tooth of said gear rack is pushed against said indexing gear upon advancement of said magazine, thereby permitting said first tooth to move past said indexing gear, and biasing means urging said indexing gear into said gear rack engaging position.

2. In a slide changer for a slide projector and adapted to accept a magazine having a gear rack in which the pitch of one of the teeth differs from the pitch of the teeth that follow, the combination comprising: a housing for slidably supporting the magazine, a toothed indexing gear carried by said housing in position to engage said gear rack when said magazine is supported by said housing, said indexing gear having a gear rack engaging position in which the teeth of the indexing gear are positioned for driving engagement with said following teeth for advancing said magazine upon rotation of said gear, and means mounting said indexing gear for movement out of said gear rack engaging position when said one tooth of said gear rack is pushed against said indexing gear upon advancement of said magazine, thereby permitting said one tooth to move past said indexing gear, and biasing means urging said indexing gear into said gear rack engaging position.

3. The invention according to claim 2 wherein said indexing gear has axially extending spindles, and said biasing means comprises a substantially V-shaped spring interposed between each spindle and said housing.

4. The invention according to claim 3 and further including detent means of a predetermined force for releasably holding said indexing gear against rotation, and said V-shaped springs urge said gear into said gear rack engaging position with a force less than said predetermined force.

References Cited in the file of this patent
UNITED STATES PATENTS

| | | |
|---|---|---|
| 544,493 | Wigle | Aug. 13, 1895 |
| 2,874,497 | Huff et al. | Feb. 24, 1959 |
| 2,901,942 | Tackberry | Sept. 1, 1959 |
| 2,968,993 | Briskin et al. | Jan. 24, 1961 |

FOREIGN PATENTS

| | | |
|---|---|---|
| 1,173,487 | France | Oct. 27, 1958 |